United States Patent [19]

Moll

[11] 4,346,857

[45] Aug. 31, 1982

[54] FISHING REEL

[75] Inventor: Robert Moll, Cheserex, Switzerland

[73] Assignee: Etablissement Liotte Representations Etrangeres, Vaduz, Liechtenstein

[21] Appl. No.: 133,921

[22] Filed: Mar. 25, 1980

[30] Foreign Application Priority Data

Mar. 29, 1979 [CH] Switzerland ............................. 2896/79

[51] Int. Cl.³ .............................................. A01K 89/00
[52] U.S. Cl. ..................................... 242/84.3; 185/39; 192/45
[58] Field of Search ................. 242/84.3, 84.1 R, 107; 185/39; 192/45

[56] References Cited

U.S. PATENT DOCUMENTS

| 389,070 | 9/1888 | Gillet | 242/84.3 |
| 2,124,634 | 7/1938 | Russell et al. | 242/84.3 |
| 2,130,670 | 9/1938 | Maynes | 242/84.3 |
| 2,130,671 | 9/1938 | Maynes | 242/84.3 |
| 2,220,017 | 10/1940 | Maynes | 242/84.3 |
| 2,340,892 | 2/1944 | Maynes | 242/84.3 X |

FOREIGN PATENT DOCUMENTS 2880 of 1912 United Kingdom ............... 242/84.1

Primary Examiner—Billy S. Taylor

[57] ABSTRACT

A fishing reel is disclosed which comprises a rotatable line drum and actuating means for rewinding the fishing line onto said drum. Said actuating means include a pulley driven by manually pulling a wire, a return device for said pulley and a unidirectional clutch for temporarily couple the pulley to the line drum for rewinding the line.

2 Claims, 3 Drawing Figures

FISHING REEL

The present invention relates to actuating means for a fishing reel with rotatable line drum.

Known fishing reels usually have a winding mechanism incorporating a crank and some kind of gearing. For rewinding the line onto the line drum a circular manual movement is therefore necessary.

The conventional actuating means are limited in the speed of rewinding the line or, when using a gearing to increase said speed, they require increased effort from the operator and increase the weight of the fishing reel. Other rewinding systems making use of a loaded spring are limited in the number of turns made by the drum and provide a decreasing rewinding torque in the course of their operation.

It is a main object of the invention to provide a fishing reel with improved actuating means for rewinding the fishing line on a rotatable drum.

A further object of the invention is to provide a most reliable clutch mechanism for coupling the rotatable drum and the actuating means during the rewinding operation.

In accordance with the invention, a flexible wire, cable or ribbon (hereafter generically referred to as a cable) is wound on an actuating pulley to drive the same by a pulling action of the operator. The rotational movement is transmitted to the line drum through a clutch device acting temporarily during the rewinding operation. In other words, except for the rewinding period, the line drum is free to rotate in either direction. After each pulling action the wire is released and rewound onto the pulley by means of a return spring acting on said pulley.

Other objects and advantages of the invention will become apparent from the following description giving two examples of embodiments illustrated in the accompanying drawings, in which.

While the invention will be described in connection with a preferred embodiment, it is understood that the invention is not limited to those embodiments but covers alternative and equivalent constructions as may be included within the spirit and scope of the invention as defined in the appended claims.

Figure 1:
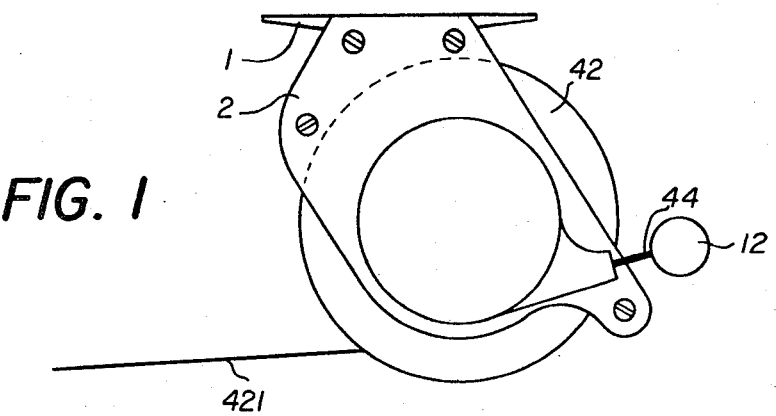
FIG. 1 is a diagrammatic side view of a fishing reel according to the invention.
Figure 2:
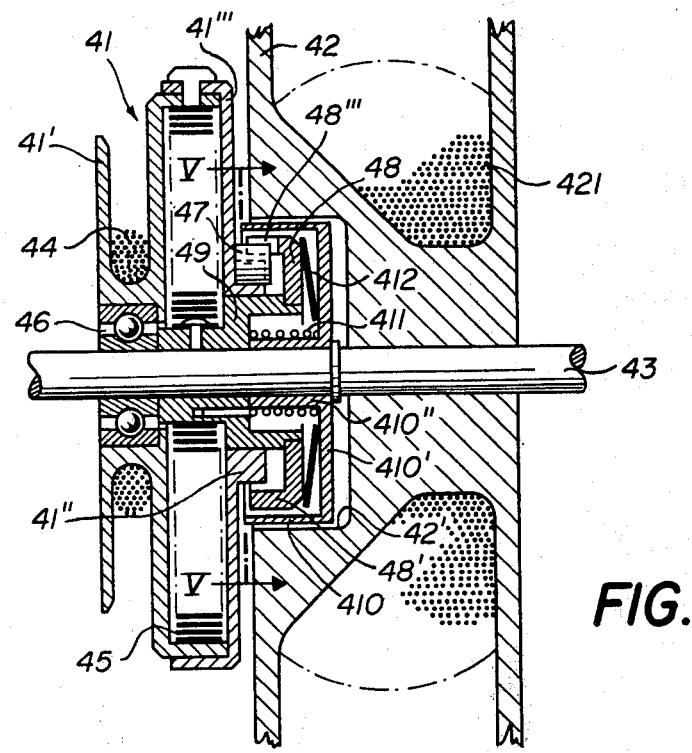
FIG. 2 is an axial sectional view of another embodiment of an actuating device in a fishing reel according to the invention.

Turning now to the drawings, the embodiment of a fishing reel shown in FIG. 1 comprises a mounting bracket 1 allowing to attach the reel to a fishing rod not shown. A frame 2 is secured to bracket 1 for supporting a fixed shaft of a line drum 42. Line drum 42 is mounted for free rotation on said shaft and carries a reserve of fishing line 421. An actuating device is mounted for free rotation on said shaft and comprises a pulley carrying an actuating wire or cable 44. A handle 12 is attached to one end of wire 44. Referring to FIG. 2, said actuating device is shown at 41 and said fixed shaft is designated by 43.

A pulley 41' is secured to a cam member 41" which is integral with a flange 41'''. A flange of pulley 41' and flange 41''' form the lateral parts of a housing for a spiral spring 45, one end of which is secured to the peripheral part of pulley 41' and the other end of which is fixed to shaft 43 through a cage supporting member 49 also fixed to stationary shaft 43. Actuating device 41 is adapted for rotation about shaft 43 by means of a bearing 46 and a cylindrical supporting surface of member 49 supporting cam member 41".

Figure 3:
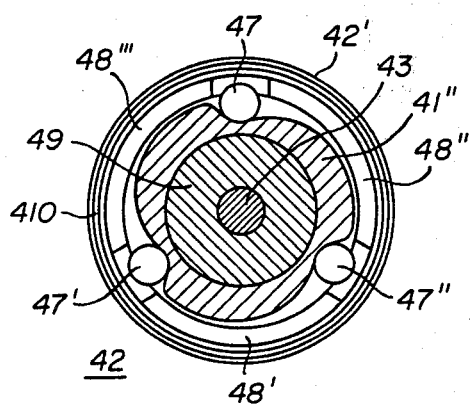
FIG. 3 is a cross-sectional view taken in the plane V—V of FIG. 2.

Three rollers 47, 47' and 47" are placed on three corresponding cam sections of cam member 41" as shown in FIG. 3. These rollers are guided axially by flange member 41''' and by the body part of a cage member 48, while axially projecting parts 48', 48" and 48''' constitute guiding means in the peripheral direction of cam member 41" for maintaining a substantially constant spacing between rollers 47, 47' and 47". Cage member 48 is arranged for rotation on a shoulder of cage supporting member 49.

Line drum 42 carrying the fishing line 421 comprises a cylindrical recess 42' surrounding cam member 41" and the rollers placed thereon. A cylindrical spring member 410 is placed within the annular space between cage member 48 and the cylindrical surface 42" and one end of it is secured to a disc-shaped spring supporting member 410'. Member 410' is integral with a cylindrical coaxial supporting member 410" which is mounted for rotation about shaft 43. A helicoidal spring 411 is placed on the outer cylindrical surface of supporting member 410" in slightly frictional relationship therewith. One end of spring 411 is fixed to the stationary cage supporting member 49, said end being, for instance, introduced into a hole of member 49 as shown in FIG. 2. A plate spring 412 is placed between member 410' and the cage member 48 and produces a slight braking effect on that cage member.

In operation of the above described device, when the operator pulls wire 44, pulley 41' is rotated in a first direction, spring 45 is tensioned with respect to shaft 43 and rollers 47, 47', 47" are caused to move on the cam surface to assume a wedging position in which the cylindrical spring member 410 is applied by said rollers against the cylindrical surface 42' of the recess in the line drum. Referring to FIG. 3, said first direction of rotation corresponds to the counter-clockwise direction of rotation of drum 42 coupled to cam member 41". Spring member 411, which is in frictional contact with the surface of member 410", is adapted to allow free rotation of supporting member 410" and thus of the cylindrical spring member 410, the winding direction of the spring turns being such as to slightly open the spring turns when driven by the frictional contact with member 410" in said first direction of rotation.

Figure 4:
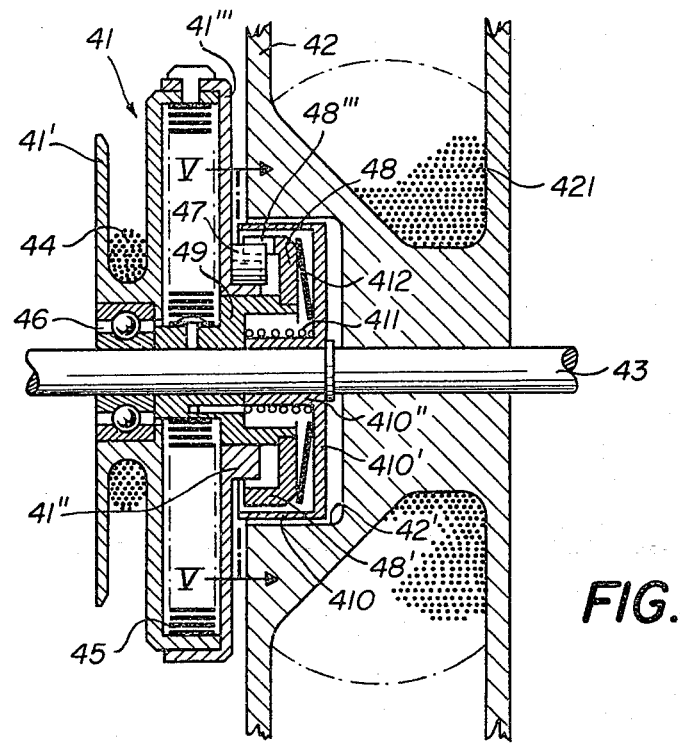
Figure 5:
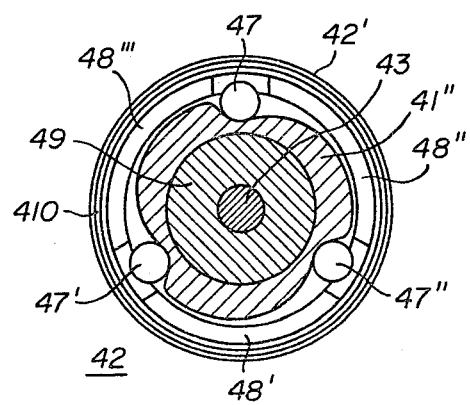

When wire or cable 44 is released, pulley 41' is rotated by the action of spring 45 in the opposite direction of said first direction, wire 44 being thereby rewound on pulley 41'. Upon starting of this rotation the rollers 47, 47', 47" are moving back on the cam surface of cam member 41" to the position shown in FIG. 3 where they are no longer in contact with spring member 410. Said spring member therefore resumes the position shown in FIG. 4 and line drum 42 is free to rotate in either direction.

It is to be noted that in the second direction of rotation which corresponds to the clockwise direction in FIG. 3, the helicoidal spring 411 prevents rotation of the supporting member 410". Should this member 410" tend to rotate in said second direction, spring member 411 tightens around said member due to its frictional contact therewith and due to the mentioned winding direction. The supporting of spring member 410 in coaxial relationship with respect to cam member 41" and drum surface 42' and the hindering of a rotation thereof in a direction corresponding to the return movement of pulley 41' under the action of spring 45, prevents accidental jamming of the clutch device in the engaged state. This results in a high degree of safety in the operation of the fishing reel as described above.

I claim:

1. A fishing reel comprising a rotatable line drum and actuating means for rewinding the fishing line onto said drum, said actuating means comprising an actuating pulley on which a flexible cable is wound, said flexible cable being adapted to allow manually pulling the same to rotate said pulley, a return device coupled to said pulley for rotating the same back into a rest position subsequently to said pulling of said cable, and a unidirectional clutch device adapted to temporarily couple said actuating pulley to said line drum for rewinding the cable, said clutch device further comprising a radially extending cam member secured to said actuating pulley, a hollow member secured to said line drum having a cylindrical inner surface coaxially surrounding said cam member, at least two rollers freely placed on the peripheric surface of said cam member and roller guiding means for maintaining said rollers in parallel relationship with the axis of said line drum and in substantially constant spacing from each other, the shape and the dimensions of said cam member and the respective diameter of said cylindrical surface of said hollow member and of said rollers being adapted to cause the rollers to take up a wedging position for coupling said actuating pulley to said line drum when the cam member is rotated in a first direction, and to cause the rollers to move into an inoperative position, allowing free rotation of said line drum, when the cam member is rotated in the second, i.e. opposite direction, said clutch device further comprising a cylindrical spring member arranged in the space between said rollers and said cylindrical inner surface of said hollow member, so as to contact said hollow member only in the coupled state of the clutch device, said cylindrical spring member having a supporting member adapted to maintain the same in coaxial relationship with respect to the line drum and to prevent rotation of said cylindrical spring member except in the direction in which the coupling occurs.

2. A fishing reel as claimed in claim 1, wherein said supporting member of said cylindrical spring member comprises a substantially disc-shaped supporting part, one end of the spring member being fixed on the peripheral edge of the supporting part, a coaxial cylindrical rotatable supporting part secured to said disc-shaped supporting part, and a helicoidal spring arranged around said cylindrical supporting part, one end of said helicoidal spring being fixed with respect to said line drum and the windings of said spring being in slight frictional contact with the surface of said cylindrical supporting member, said helicoidal spring being thus tightened on said cylindrical supporting member and blocking the rotation thereof when said cylindrical spring member tends to turn in the direction opposite to the direction in which the coupling of the line drum with the actuating pulley occurs, while in the coupling direction the helicoidal spring has a tendency to expand and allows free rotation of the cylindrical spring member.

* * * * *